June 10, 1930.  H. P. SLEEPER  1,763,195
RELAY TESTING APPARATUS
Filed Oct. 5, 1926   3 Sheets-Sheet 1

WITNESSES:

INVENTOR
Harvey P. Sleeper.
BY
ATTORNEY

June 10, 1930.  H. P. SLEEPER  1,763,195
RELAY TESTING APPARATUS
Filed Oct. 5, 1926   3 Sheets-Sheet 3

INVENTOR
Harvey P. Sleeper

Patented June 10, 1930

1,763,195

UNITED STATES PATENT OFFICE

HARVEY P. SLEEPER, OF ELIZABETH, NEW JERSEY

RELAY-TESTING APPARATUS

Application filed October 5, 1926. Serial No. 139,619.

My invention relates to relay testing apparatus, and particularly to apparatus used in connection with automatic circuit-interrupters in electrical generating or distribution systems.

An object of my invention is to simplify the testing routine in connection with the protective relays used in electrical stations, so that the work may be done by relatively unskilled labor.

A further object of my invention is to simplify the construction of the apparatus used in conjunction with the testing of protective relays in electrical stations, in order to simplify the testing operations and to decrease the possibility of derangement of the relays and circuit-interrupter control circuits while performing these operations.

A further object of my invention is to provide a testing switch panel for use in conjunction with protective relays mounted on the switchboard of an electrical station, which may be applied either to new or to existing relay installations without modifying the relays or the switchboard.

A still further object of my invention is to provide a distinctive signal on the front of the switchboard to indicate to the station operator that a relay is being tested, or that the circuit-interrupter controlled thereby has been rendered non-automatic in some other manner. In order to decrease the amount of apparatus required and to utilize the switchboard more efficiently, the preferred form of my invention contemplates the use of the colored pilot lamps on the switchboard ordinarily used in connection with the circuit-interrupters to indicate their open or closed position, for indicating the above-mentioned abnormal condition. The pilot lamps are lighted in a distinctive or unusual manner when the associated breaker is rendered non-automatic.

A distinctive signal of this kind serves to call to the attention of the station operator the fact that a circuit-interrupter, through which power may be flowing, has been rendered inoperative by reason of the failure of the tripping coil or the tripping-coil circuit of the interrupter. Such a failure occurs occasionally and it is of the utmost importance that the condition be noted and corrected as soon as possible after it occurs, in order to prevent damage to the station and interference with the service to the customers connected thereto in case the circuit-interrupter should fail to open when a fault occurs.

Furthermore, since the indicating means will be operated when the control relays have been rendered inoperative for testing purposes, the tendency to close a switch associated with such a relay will be minimized. It is the usual practice to disconnect feeders from service when the associated relays are being tested, and since the operator will be confronted by the signal if he carelessly attempts to close the switch, such accidental reclosures will be prevented.

For a better understanding of my invention reference should be had to the accompanying drawings, in which Fig. 1 is a front view of a switchbotrd showing the instruments and control switches thereon;

Figure 1:
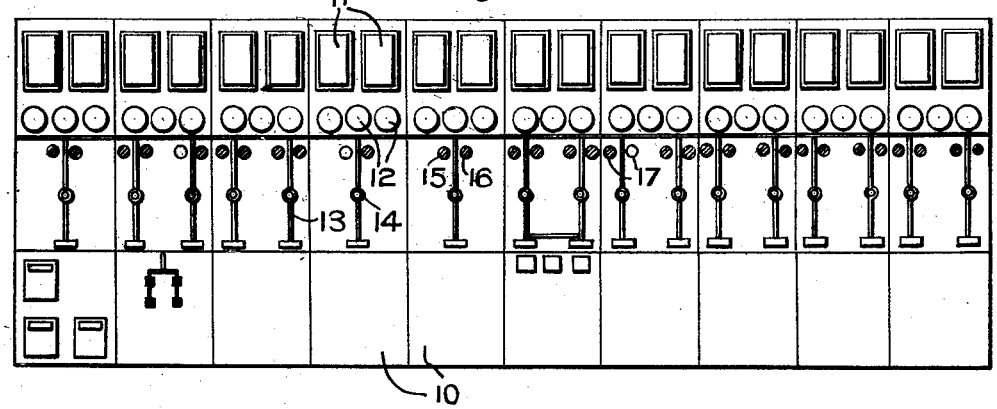

Referring to Fig. 1, a typical switchboard similar to those installed in large electrical stations is shown, comprising a plurality of panels 10 each having relays or other instruments 11 and 12 upon the upper portion thereof. A plurality of miniature strap conductors 13 corresponding to the feeder layout of the system outside of the station is mounted on the central portion of each panel of the switchboard. The circuit-interrupters in the several feeders, although in the same station, are usually at some distance from the switchboard and are controlled by means of the remote control switches 14 which energize the closing and tripping coils of the circuit-interrupters.

A pair of pilot lamps 15 and 16 adjacent each control switchboard miniature feeder conductor serves to indicate the open or closed condition of the associated circuit-interrupter. The pilot lamps may be colored red and green, and are ordinarily so connected that the red lamp only is lighted when the circuit-interrupter is closed and the green lamp only is lighted when the circuit-interrupter is open.

The switchboard in a large generating station may contain other apparatus besides that which I have shown, but is usually as small and compact as possible for reasons of economy and ease of operation. Since it is desirable to avoid the addition of further auxiliary equipment to the front of the switchboard, in accordance with my invention the auxiliary relay testing apparatus is mounted behind the respective relays and the non-automatic condition of the associated circuit-interrupter, when one of the relay testing switches has been opened, is indicated by the simultaneous lighting of both of the pilot lamps 15 and 16 associated with the circuit-interrupter.

This signal, which I have termed the double-lamp indication, is very striking in appearance and easily distinguished from the normal red or green single-lamp indication. Furthermore, the signal, although effective for the purpose intended, does not require any auxiliary apparatus nor the addition of any new apparatus to the front of the switchboard. The desirability of these features will be recognized without any difficulty by those who are familiar with the design and construction of switchboards for electrical distribution stations.

Figure 2:
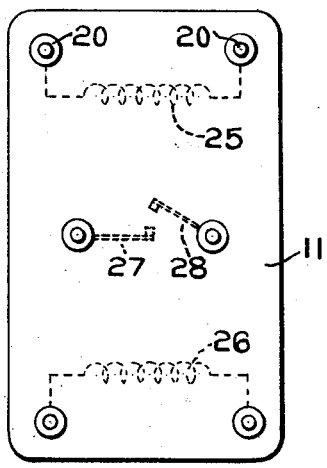
Fig. 2 is a rear view of a relay, such as those shown in Fig. 1, drawn to an enlarged scale.
Figure 3:
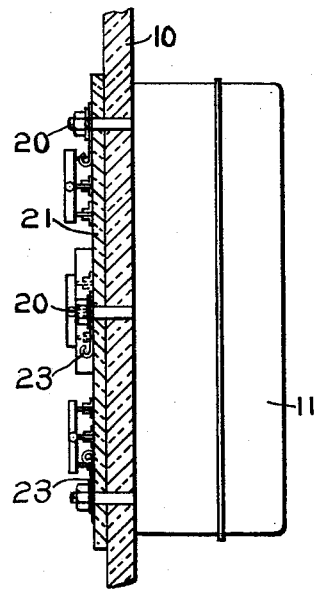
Fig. 3 is a sectional view of the switchboard, showing the manner of mounting the relay and the testing-switch panel thereon.

As shown in Figs. 2 and 3, the protective relays 11 are provided with projecting contact terminal studs 20 adapted to co-operate with the switchboard panels 10, the terminal studs being adapted both to secure the relay in place upon the switchboard and to provide a connection to the switchboard wiring behind the panels.

A testing-switch panel 21 of fibre or similar insulating material is clamped beneath the contact terminal studs on the rear of the switchboard. The testing-switch panel 21 is perforated as indicated at 22 (Fig. 4) and is provided with metallic rivets or terminal members 23 to which the test switch apparatus mounted on the panel 21 is wired before these panels are placed in position on the switchboard. It is therefore unnecessary, when assembling the complete switchboard, to make any connections between the testing switches and the relays, except as will be provided when the switch panel is clamped upon the relay terminal studs.

As indicated in Fig. 2, the relay 11 may comprise two windings 25 and 26, such as the current and potential windings of a power-directional relay, and co-operating contact members 27 and 28 controlled thereby. In the usual application of the relay, the windings 25 and 26 are connected to the circuit controlled by the circuit-interrupter which is adapted to be actuated by the contact members 27 and 28. When the electrical conditions in the circuit are such that the protective relay is operatively energized, the contact members 27 and 28 engage to trip the circuit-interrupter and open the circuit. In some cases the protective relays have more or less than two windings.

Figure 4:
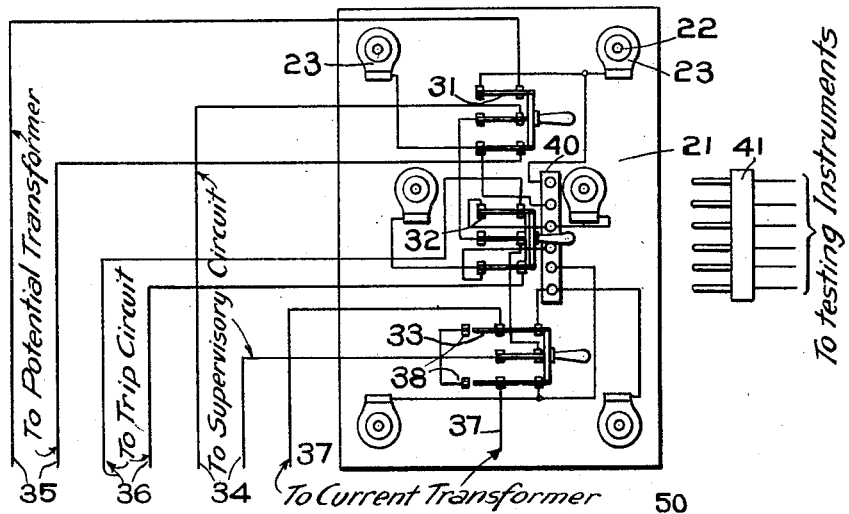
Fig. 4 is a detailed view of a testing-switch panel for a relay having both current and potential windings.

In Fig. 4 is shown a testing-switch panel adapted for the relay shown in Fig. 2. The construction of a similar panel for other types of relays will be obvious. The panel is provided with three testing switches 31, 32 and 33. Each of the switches is a three-pole switch, the middle contact arms being connected in series with each other and with a supervisory circuit 34. The switch 31 is adapted, when operated, to open the circuit of the potential winding 25 of the relay connected to the potential transformer circuit 35. The switch 32 is adapted, when operated, to open the trip circuit 36 connected to the contact members 27 and 28, thereby rendering the associated circuit-interrupter non-automatic. The switch 33 is adapted, when operated, to open the circuit of the current winding 26 of the relay and to short-circuit the current-transformer circuit 37 through the normally open switch terminals 38.

The several contact terminal studs 23 of the relay are connected to a jack 40 on the testing-switch panel, which is adapted to co-operate with a multi-conductor testing plug 41 to connect the circuits of the relay to associated instruments for testing purposes. Since the general arrangement of these instruments is old and well known, it is not illustrated in detail. The jack 40 is preferably so disposed, as shown in Fig. 4, that the plug 41 cannot be inserted in the jack except when the switch 32 is open, thereby insuring that the relay tripping circuit will be opened before the commencement of the testing operation.

Figure 5:
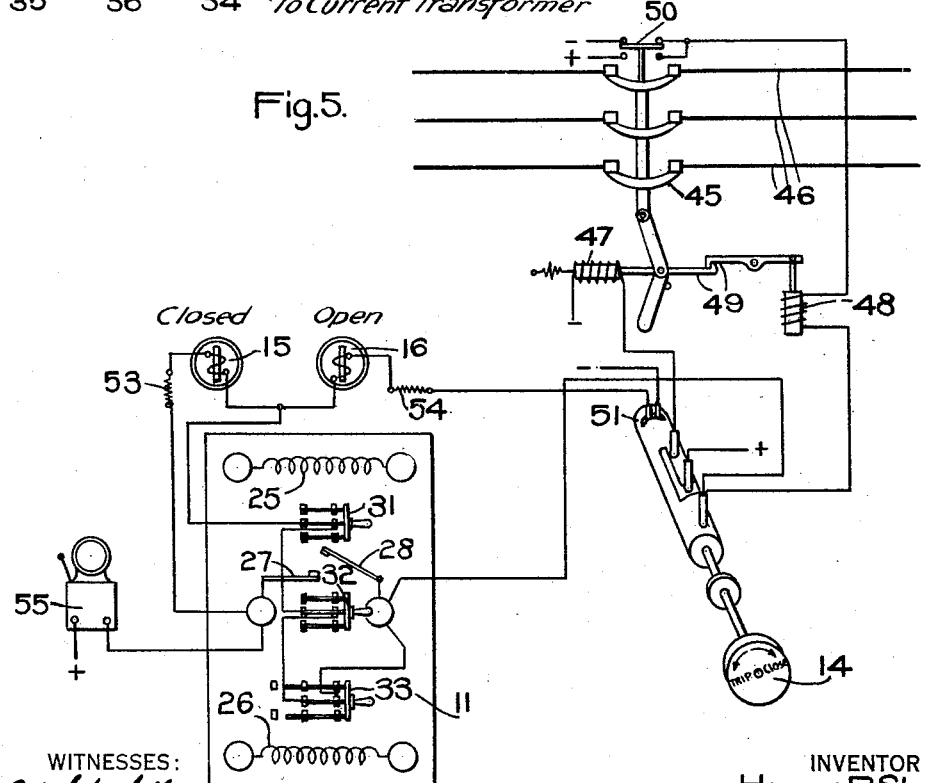
Fig. 5 is a circuit diagram of a control system for a circuit-interrupter embodying my invention.

The operation of the relay testing apparatus which I have described, and of the signalling apparatus used in conjunction therewith, will be clear from a consideration of the typical installation shown in Fig. 5. An automatic circuit-interrupter 45, adapted to control a three-phase feeder 46, is provided with a closing coil 47 and a tripping coil 48. After the circuit-interrupter has been closed by energization of the closing coil 47, it is latched in the closed position by the latch members 49 until released by the energization of the tripping coil 48.

The energization of the tripping coil is controlled by the manual control switch 14 and by the relay 11. The circuit-interrupter 45 is provided with a pallet switch 50 which is arranged to control the pilot lamps 15 and 16 in accordance with the position of the circuit-interrupter. The manual control switch 14, the relay 11 and the pilot lamps 15 and 16 are mounted on the switchboard, as indicated in Fig. 1.

If the circuit-interrupter 45 is in the closed position, as indicated, a circuit is closed from negative battery through the front pallet-switch contacts 50, the tripping coil 48, the middle supervisory contact members of the switches 31, 32, 33, the pilot lamp 15, resistor 53 and the bell-alarm 55 to positive battery. The pilot lamp 15 only is lighted but on account of the high resistance of the pilot lamp and resistor 53, the tripping coil 48 receives only a small current and is not operatively energized.

If the circuit-interrupter 45 is open, a circuit is closed from positive battery through the back pallet-switch contacts 50, the tripping coil 48, the middle supervisory contacts of testing switches 31, 32 and 33, the pilot lamp 16, resistor 54 and the contact members 51 of the manual control switch to negative battery. The pilot lamp 16 only is lighted and indicates the open position of the switch.

In case any portion of the tripping-coil circuit is accidentally broken, or one of the testing switches 31, 32 or 33 is open, the described circuits for the pilot lamps 15 and 16 are interrupted irrespective of whether the circuit-interrupter be open or closed at the time, and since the two lamps are connected in series across the battery, both become lighted. Thus a distinctive signal results which indicates to the station operator that the circuit-interrupter has been rendered non-automatic.

If the relay 11 is not being tested, the operator will examine the switches 31, 32 and 33 to make sure that they are closed. If the break is in the tripping-coil circuit, immediate steps will be taken to repair it. On the other hand, if the operation of the pilot lamps is the result of the intentional opening of the testing switches 31, 32 and 33 for the purpose of testing the relay, in which case the circuit-interrupter 45 will be open, such operation of the lamps serves to prevent the station operator from accidentally reclosing the circuit-interrupter 45 before the testing operation is completed. Since the pilot lamps 15 and 16 are adjacent to the handle of the manual control switch 14, as shown in Fig. 1, it would be difficult to reclose the circuit-interrupter 45 without noting the fact that both pilot lamps were lighted since these same lamps are always carefully examined by the operator before performing any switch operations, being the only devices on the switchboard which tell the operator the position of the remote switch. The appearance of the switchboard with both pilot lamps lighted is indicated at 17 in Fig. 1. When a feeder is out of service, the "open" lamp 16 may be extinguished by opening the circuit at the contacts 51 by manipulation of the control switch 14.

It will be apparent that I have described apparatus that will facilitate the testing of relays and the discovery of the non-automatic condition of a circuit-interrupter, although no apparatus is added to the front of the switchboard and the only additional apparatus required is a small testing panel and test jack mounted directly on the contact terminals of the relay on the back of the switchboard. The indication of an abnormal condition is directly before the station operator and is of an effective character.

Figure 6:
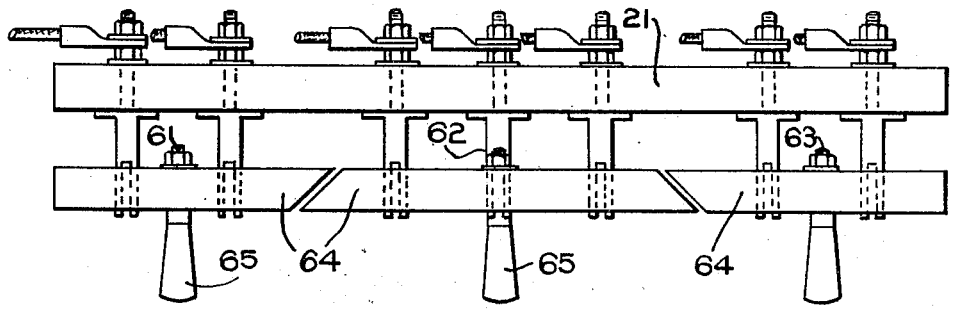
Figs. 6 and 7 are top and front views, respectively, of a modified form of testing-switch panel.
Figure 7:
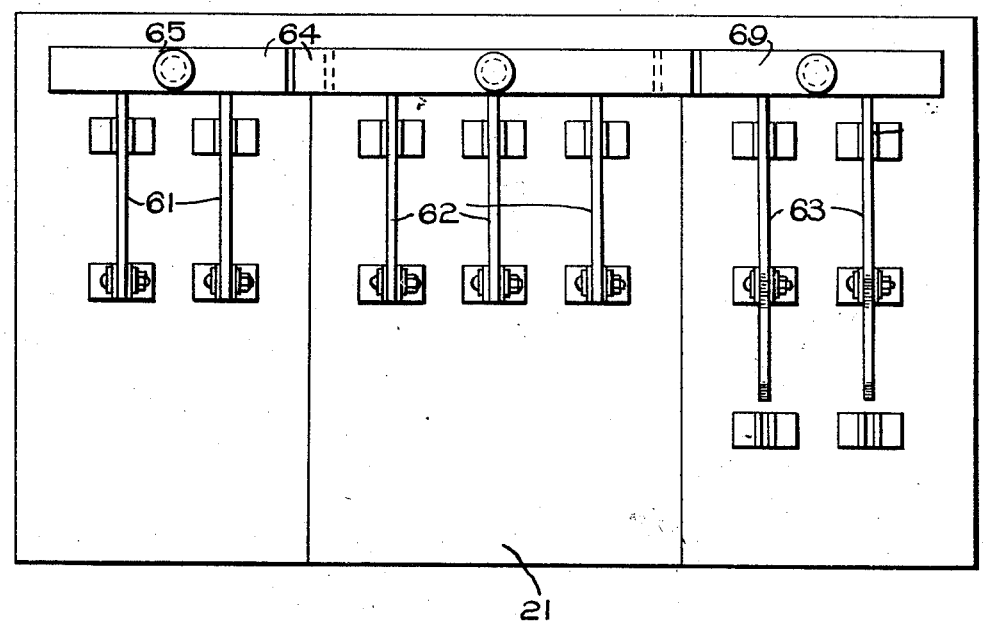

The construction of the testing-switch panel may be modified in various ways, for example, as shown in Figs. 6 and 7, only one of the testing switches may be provided with contacts in the supervisory circuit and this switch may be mechanically interlocked with the other switches in such a manner that it is opened when any of the other switches are opened. Referring to Figs. 6 and 7, three switches 61, 62 and 63, corresponding to the switches 31, 32 and 33 are mounted on the panel 21. One of the switches, for example 62, is a three-pole switch to provide an extra contact member for the supervisory circuit.

The insulating members 64 of the switches to which the operating members 65 are secured, are interlocked as shown, so that it is impossible to open any of the switches without opening switch 62 which is arranged to control the supervisory circuit.

In so far as the mechanical construction of the testing panel is concerned, many changes and modifications will occur to those skilled in the art, and I desire to cover such changes or modifications as come fairly within the scope of the appended claims.

I claim as my invention:

1. An electrical distribution system comprising a circuit-interrupter provided with front and back pallet switches and a tripping coil, a manual control switch for controlling the energization of the tripping coil, a relay for controlling the energization of the tripping coil, said relay having a contact circuit and an energizing circuit, auxiliary switches for opening said contact and energizing circuits when testing the relay, two pilot lamps controlled by said front and back pallet switches for indicating the open and closed positions of the circuit-interrupter, respectively, and means whereby both of said pilot lamps are lighted when either of said auxiliary switches is opened.

2. In combination with an automatic circuit-interrupter and means for indicating the open and closed positions thereof, means including said indicating means for rendering evident the non-automatic condition of the circuit-interrupter resulting from a break at any point in its control circuit.

3. In combination with an automatic circuit-interrupter and individual pilot lamps for indicating the open and closed positions thereof respectively, means for energizing said lamps simultaneously when the circuit-interrupter is rendered non-automatic by a break at any point in its control circuit.

4. In combination with an automatic circuit-interrupter and means for operating the same in response to the electrical conditions of the associated circuit, a pair of pilot lamps, means for lighting one lamp when the circuit-interrupter is open and the other when the circuit-interrupter is closed and means for lighting both lamps simultaneously when the circuit-interrupter is rendered non-automatic by a break at any point in its control circuit.

5. An electrical distribution system comprising a circuit-interrupter provided with an actuating coil, a relay controlling the circuit of said coil, a pair of pilot lamps for indicating the open and closed positions of the circuit-interrupter, means for rendering said relay or actuating coil inoperative, and means including said pilot lamps for indicating an inoperative condition of the relay or the circuit of said actuating coil resulting from an operation of said means.

6. An electrical distribution system comprising a circuit-interrupter provided with a pallet switch and an actuating coil, two pilot lamps connected in series to a source of current, and connections from said source to the contacts of said switch whereby either of said lamps may be shunted and the other connected in series with the actuating coil by the pallet switch depending upon the position of said interrupter.

7. An electrical distribution system comprising a circuit-interrupter provided with a pallet switch and an actuating coil, a contact device adapted to control said actuating coil, a source of current having its opposite terminals connected to the contacts of said pallet switch, a signal in shunt relation to said contact device of sufficiently high resistance that said actuating coil is not operatively energized therethrough, and a second signal connected in series with said first signal to said source.

8. An electrical distribution system comprising a circuit-interrupter provided with a pallet switch and an actuating coil, a contact device for controlling the energization of said actuating coil, a pilot lamp in shunt relation to said contact device of sufficiently high resistance to preclude operative energization of the actuating coil therethrough and a second pilot lamp, said lamps being bridged in series relation across said source and adapted to be alternately shunted as said interrupter is opened and closed.

In testimony whereof I have hereunto subscribed my name this 30th day of August, 1926.

HARVEY P. SLEEPER.